United States Patent
Kelley et al.

(10) Patent No.: US 11,958,045 B2
(45) Date of Patent: Apr. 16, 2024

(54) RECOVERY AND RECYCLING OF BYPRODUCTS OF ACTIVATED ALUMINUM

(71) Applicant: Massachusetts Institute of Technology, Cambridge, MA (US)

(72) Inventors: Jude Kelley, Bolton, MA (US); Eric Morgan, Bolton, MA (US); Roderick Russell Kunz, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/705,175

(22) Filed: Mar. 25, 2022

(65) Prior Publication Data

US 2022/0305483 A1    Sep. 29, 2022

Related U.S. Application Data

(60) Provisional application No. 63/166,477, filed on Mar. 26, 2021.

(51) Int. Cl.
| | |
|---|---|
| *B01J 38/68* | (2006.01) |
| *B01J 23/08* | (2006.01) |
| *B01J 23/94* | (2006.01) |
| *B01J 38/64* | (2006.01) |

(52) U.S. Cl.
CPC ............ *B01J 38/68* (2013.01); *B01J 23/08* (2013.01); *B01J 23/94* (2013.01); *B01J 38/64* (2013.01); *B01J 2523/31* (2013.01); *B01J 2523/32* (2013.01); *B01J 2523/33* (2013.01)

(58) Field of Classification Search
CPC ... B01J 38/68; B01J 38/64; B01J 23/08; B01J 23/94; B01J 2523/31; B01J 2523/32; B01J 2523/33
See application file for complete search history.

(56) References Cited

U.S. PATENT DOCUMENTS

| | | | |
|---|---|---|---|
| 9,731,967 B1 * | 8/2017 | Woodall | ............... C01B 3/08 |
| 10,745,789 B2 | 8/2020 | Slocum | |
| 11,268,180 B2 | 3/2022 | Slocum | |
| 2008/0056986 A1 | 3/2008 | Woodall et al. | |

(Continued)

FOREIGN PATENT DOCUMENTS

| | | | |
|---|---|---|---|
| CN | 101235451 B | * | 10/2011 |
| CN | 109879250 A | | 6/2014 |
| WO | WO 2022/261083 A1 | | 12/2022 |

OTHER PUBLICATIONS

Machine Translation of CN 101235451 B. (Year: 2011).*

(Continued)

*Primary Examiner* — Coris Fung
*Assistant Examiner* — Catriona M Corallo
(74) *Attorney, Agent, or Firm* — Wolf, Greenfield & Sacks, P.C.

(57) ABSTRACT

Methods, systems, and compositions related to the recycling and/or recovery of activating materials from activated aluminum are disclosed. In one embodiment, an aqueous solution's composition may be controlled to maintain aluminum ions dissolved in solution during reaction of an activated aluminum. In another embodiment, aluminum hydroxide containing the activating materials may be dissolved into an aqueous solution to isolate the activating materials.

15 Claims, 3 Drawing Sheets

(56) References Cited

U.S. PATENT DOCUMENTS

2009/0289457 A1 11/2009 Gleasman
2020/0199728 A1 6/2020 Slocum

OTHER PUBLICATIONS

Vibhute et al. "Solvent Extraction Separation of Gallium, Indium, and Thallium with High Relative Molecular Mass Amine from Citrate Solutions". Analyst, Apr. 1986, vol. 111, Department of Chemistry, Indian Institute of Technology, p. 435-439. (Year: 1986).*

* cited by examiner

RECOVERY AND RECYCLING OF BYPRODUCTS OF ACTIVATED ALUMINUM

RELATED APPLICATIONS

This application claims priority under 35 U.S.C. § 119(e) to U.S. Provisional Application No. 63/166,477, filed Mar. 26, 2021, which is incorporated herein by reference in its entirety for all purposes.

GOVERNMENT SPONSORSHIP

This invention was made with Government support under FA8702-15-D-0001 awarded by the U.S. Air Force. The Government has certain rights in the invention.

TECHNICAL FIELD

Methods, compositions, and systems for the recovery and recycling of byproducts of activated aluminum are generally described.

BACKGROUND

Activated aluminum fuel is a promising new technology for generation of hydrogen gas via reaction with liquid water. In order to create activated aluminum fuel, ordinary aluminum metal is first stressed and fractured, and then it is treated with a small amount (typically roughly 4% by weight) of liquid metals (such as indium and gallium) at elevated temperature in order for these metals to diffuse through the grain structure of the aluminum. Once activated, aluminum will react with water to produce hydrogen for use in fuel cells or other applications.

The reaction of activated aluminum fuel with water produces more than just hydrogen. Specifically, it can be described by the following reactions (depending on the ambient temperature):

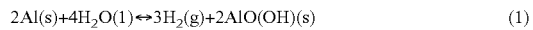

$$2Al(s)+4H_2O(l) \leftrightarrow 3H_2(g)+2AlO(OH)(s) \quad (1)$$

$$2Al(s)+6H_2O(l) \leftrightarrow 3H_2(g)+2Al(OH)_3(s) \quad (2)$$

Reactions 1 and 2 above are both exothermic, meaning they release heat. In addition to the generation of heat, they produce hydrogen gas (the desired product) and hydroxides of aluminum (a byproduct). These hydroxides, specifically aluminum oxide hydroxide (AlO(OH)) and aluminum trihydroxide (Al(OH)$_3$), are sparingly soluble solid bases. (Aluminum trihydroxide is commonly sold in suspended form as part of the antacid Maalox.) These solid hydroxides are not harmful, and their sparing solubility inhibits their ability to substantially raise the pH of water to caustic conditions. Disposal of these hydroxides is a potential issue for the activated aluminum fuel technology, and too much buildup of these materials has the potential to foul and/or clog reactor systems designed to work with this technology.

The fate of the activating metals (indium and gallium) has traditionally been tied to these hydroxides as well. It is noted that the activating metals are not included in the above reaction, but if they are not present the reaction proceeds extremely slowly or not at all. It has been thought that the indium and gallium sequesters into the solid aluminum hydroxide byproducts at the completion of the reaction (potentially as less useful oxides), resulting in the loss of these valuable activating metals and perhaps further complicating the disposal of the aluminum hydroxide byproduct. Furthermore, reactions that render the indium and gallium difficult to recover for reuse contribute to the overall cost of activated aluminum fuel since the roughly 4 wt % indium and gallium cost more than the aluminum itself.

SUMMARY

The subject matter of the present disclosure involves, in some cases, interrelated products, alternative solutions to a particular problem, and/or a plurality of different uses of one or more systems and/or articles.

In one embodiment, a method of reacting an activated aluminum includes: exposing the activated aluminum to an aqueous solution, wherein the activated aluminum comprises aluminum combined with gallium and/or indium; reacting the aluminum in the activated aluminum with water in the aqueous solution to generate hydrogen and aluminum ions; and maintaining the aluminum ions dissolved in the aqueous solution during the reaction.

In another embodiment, a method of recovering one or more activating materials includes: adding a composition comprising aluminum hydroxide and the one or more activating materials to an aqueous solution, wherein the one or more activating materials includes at least one selected from the group of indium and gallium; dissolving the aluminum hydroxide to form aluminum ions and hydroxide ions dissolved in the aqueous solution; and forming a separate phase comprising the activating materials.

In yet another embodiment, a composition includes an activated aluminum including aluminum combined with gallium and/or indium, and an aqueous solution in contact with the activated aluminum. The aqueous solution includes a chelating agent dissolved in the aqueous solution.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
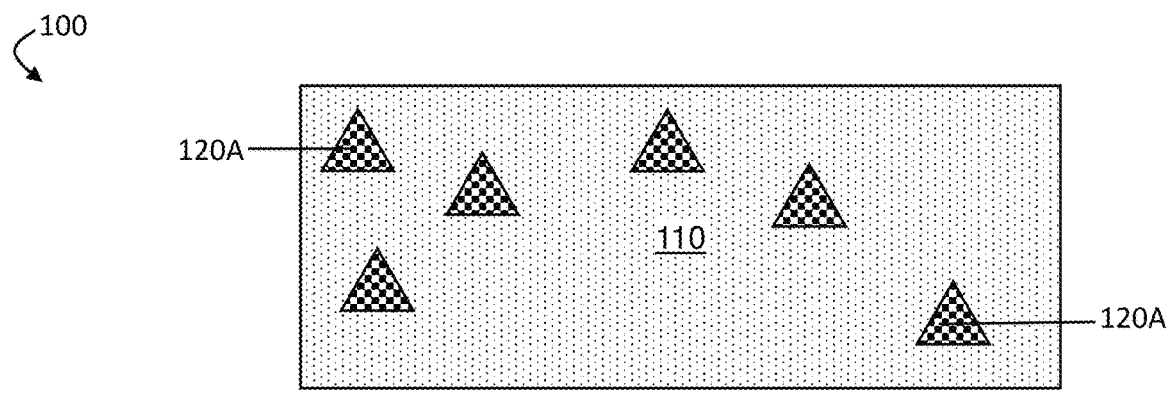
FIG. 1A is a cross-sectional schematic diagram of a composition comprising aluminum and an activating material, according to some embodiments.

Compositions, systems, and methods for the recovery of activating metals (e.g., indium and/or gallium) from an activated metal are generally described. Recovering activating metals from certain existing activated metals has presented certain challenges. For example, liberating the activating metals from the activated metal during and/or after reaction of the activated metal can be made difficult due to entrapment of the activating metals within the activated metal and/or within products (e.g., flocculant products) of the activated metal. Although other activated metals are possible, one activated metal is aluminum, and aluminum may be activated using indium and/or gallium. However, some byproducts of the reaction of activated aluminum, such as aluminum hydroxides, may trap indium and/or gallium within its structure, making it difficult to recover the indium and/or gallium with a high recovery. Therefore, an aluminum reaction that simplifies indium and gallium recovery (or some other activating metal) would not only reduce aluminum hydroxide disposal costs, but it could also enable the reuse of the indium and gallium for use to activate new aluminum metal, thereby even further reducing overall cost.

The Inventors have recognized and appreciated an aluminum/water reaction environment that sustains $Al(OH)_3$ and $AlO(OH)$ solubility during at least a portion of the reaction of the activated aluminum to enable the recovery of activating metals (e.g., indium and/or gallium) from the activated aluminum. By successfully manipulating these solubilities, hydrogen gas may be generated by the reaction of water with the activated aluminum, without the formation of a solid aluminum hydroxide byproduct, and hence trapping of the activating metals within the solid aluminum hydroxide may be mitigated or avoided. Without wishing to be bound by any particular theory, this allows the activating metals (e.g., indium and gallium) to "fall out" of the activated aluminum metal as it reacts with water. Advantageously, the activating metal may pool up or gather into a mass (e.g., small ball) and may sink the bottom of the reaction vessel, allowing the mass of activating metal to be easily collected, and this mass may be subsequently reused to activate more aluminum. This may allow for the generation of hydrogen gas from activated aluminum fuel while allowing for the recycling of the (sometimes expensive) activating metals.

Another important aspect of this disclosure is that the byproducts of the reaction may remain dissolved in solution when the reaction is complete. Advantageously, this may improve the handling of byproducts (e.g., aluminum hydroxides) from the reaction, particularly the cleaning of interior reactor surfaces may be handled much simpler than when forming solid byproducts.

For some embodiments, when the activating metal is aluminum, enhanced recovery of the activating metal (e.g., indium and/or gallium) may be achieved, at least in part, by maintaining the aluminum ions dissolved in the aqueous solution during the reaction. For example, an activated aluminum comprising an activating metal, such as indium and/or gallium, may be exposed to an aqueous solution, whereby the activated aluminum can react with water of the aqueous solution. Upon reaction of the aluminum and water, aluminum ions may be generated, and these ions may be maintained as dissolved aluminum ions during the reaction of the activated aluminum. Advantageously, by maintaining the aluminum ions, improved recovery of the activating metal, indium and/or gallium, may be achieved. In some embodiments, maintaining the aluminum ions in the aqueous solution comprises maintaining the aqueous solution at or within a particular pH (e.g., greater than or equal to 2.5 and/or less than or equal to 8). In some embodiments, the aluminum ions are maintained in solution via a chelating agent (e.g., the aqueous solution includes a chelating agent dissolved in the aqueous solution). In some embodiments, the aluminum ions are maintained dissolved in the aqueous solution by maintaining the aqueous solution at or within a particular pH and by including a chelating agent in the aqueous solution. More details regarding maintaining aluminum ions dissolved in the aqueous solution (or other activated metal ions) are described below.

Turning to the figures, specific non-limiting embodiments are described in further detail. It should be understood that the various compositions, components, features, and methods described relative to these embodiments may be used either individually and/or in any desired combination as the disclosure is not limited to only the specific embodiments described herein.

The compositions, systems, and methods described herein can be used for the recovery of activating materials (e.g., liquid metals, such as indium and/or gallium) from aluminum, although other metals different from aluminum are also contemplated. For example, as schematically illustrated in FIG. 1A, an activated metal 100 comprises activated aluminum 110 and an activating material 120A dispersed within the activated aluminum 110. Activation of metals, such as aluminum, are described in more detail below, but, briefly, aluminum metal can be used for a variety of applications including: hydrogen generation for use in fuel cells, combustion, chemical processes, weather balloons, or other desired applications; steam and heat generation for powering a turbine; and/or any other desired application. While the activating materials may permit the use of aluminum in these applications, in some cases, separating the activating materials from the resulting products is complicated by the activating material becoming entrapped in at least some of these products. However, the Inventors have recognized and appreciated that the compositions and methods described herein can be used to recover the activating material with a relatively high recovery rate (e.g., at least 90%, at least 95%, at least 99%, at least 99.9%, by weight, of the activating material used to activate the metal can be recovered).

Figure 1B:
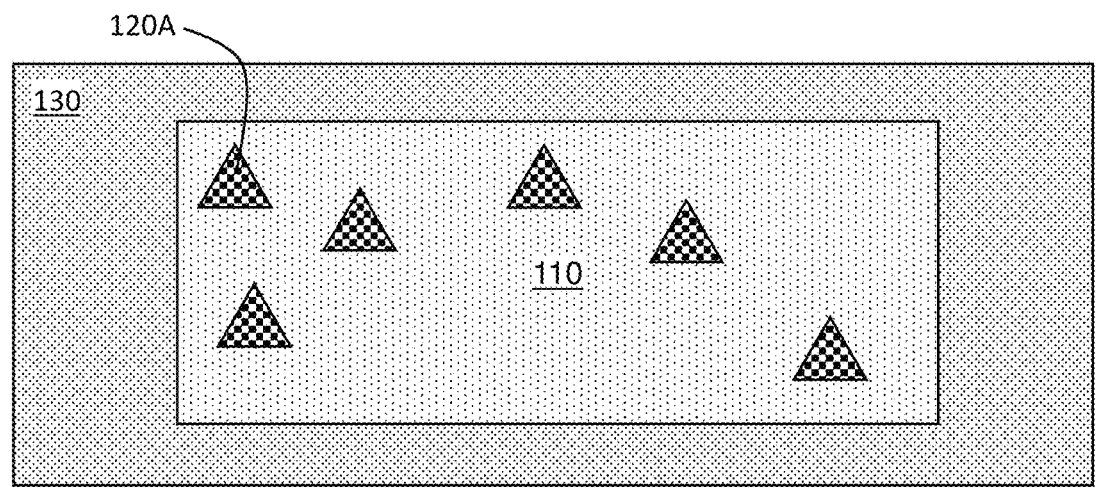
FIG. 1B is a schematic illustration of a composition comprising activated aluminum and an aqueous solution, according to some embodiments.
Figure 1C:
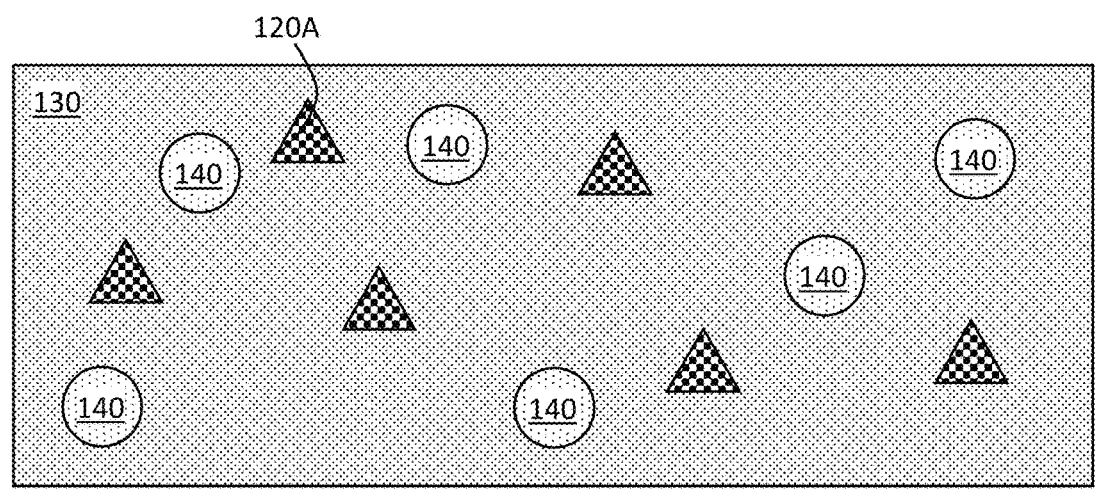
FIG. 1C is a schematic diagram depicting aluminum ions dissolved in an aqueous solution, according to some embodiments.
Figure 1D:
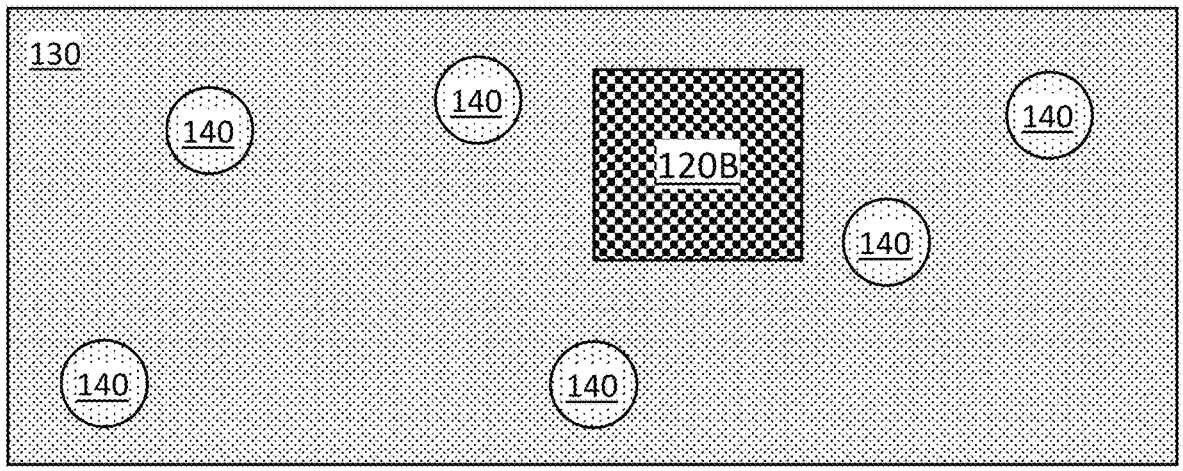
FIG. 1D is a schematic diagram depicting the phase segregation of the activating material from the solution, according to some embodiments.

By way of illustration (and not limitation), FIGS. 1B-1D schematically depict a process of recovering an activating material from an activated metal. In FIG. 1B, the activated metal 100 is placed in an aqueous solution 130, such that the activated aluminum is exposed to the aqueous solution 130. The aluminum of the activated metal 100 may react with water in the aqueous solution to generate products (e.g., hydrogen gas, aluminum ions). For example in FIG. 1C, activated metal 100 has reacted to form dissolved aluminum 140. Also in the figure, the activating material 120A has been liberated from the activated metal 100 relative to FIG. 1B. Once liberated from the activated metal 100, the activating material 120A may phase segregated from the aqueous solution 130 and may further aggregate into a mass of activating material 120B, as shown schematically in FIG. 1D. Advantageously, phase segregation of the activating material from the aqueous solution may facilitate subsequent recovery of the activating material from the solution and/or the products. Details regarding phase segregation are described in more detail elsewhere herein.

Figure 1E:
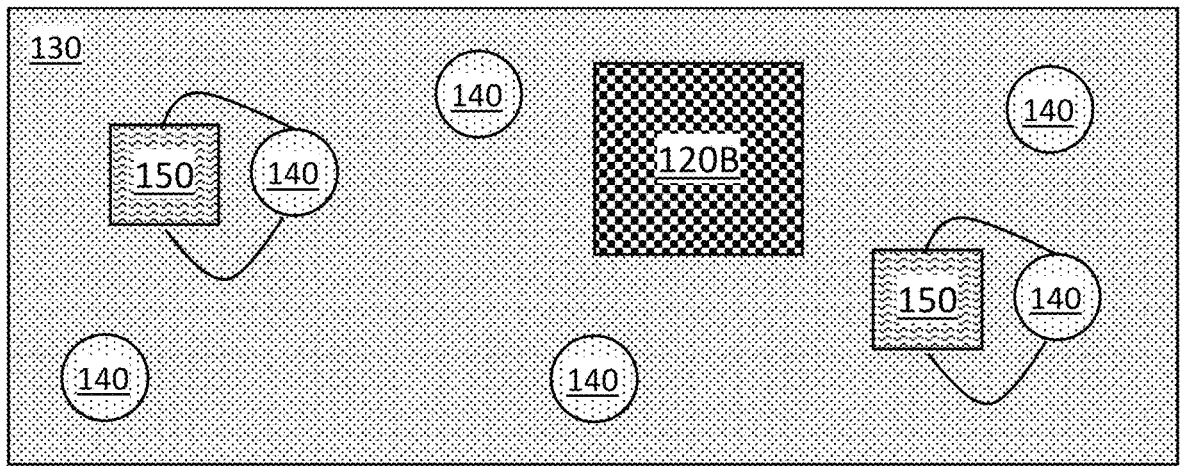
FIG. 1E is a schematic diagram illustrating the chelation of aluminum ions in aqueous solution, according to some embodiments.

The method may comprise maintaining the dissolved metal species in solution. For example, in some embodiments, a method describes maintaining the aluminum ions dissolved in the aqueous solution during the reaction. Maintaining the aluminum ions in the solution may also advantageously improve recovery of the activating material, which may not dissolve in the aqueous solution. For example, FIG. 1E schematically depicts a chelating agent 150 maintaining the dissolved aluminum 140 in the aqueous solution 130. And while the figure shows a chelating maintaining the aluminum in solution, the dissolved metal species may be maintained in solution using other techniques, for example, by maintaining the pH within a particular range, as described in more detail below.

A variety of materials may be suitable for activating a metal (e.g., aluminum). For example, in some embodiments, the activating material comprises indium (e.g., indium metal). In some embodiments, the activating material comprises gallium (e.g., gallium metal). In some embodiments, the activating material comprises a mixture of gallium and indium. In some embodiments, one or more activating materials is present. In some embodiments, the one or more activating materials includes at least one selected from the group of indium and gallium. However, other activating materials are possible, as this disclosure is not so limited. Non-limiting examples of other activating materials may include tin and alloys thereof (e.g., a tin-alloy comprising indium and/or gallium).

For embodiments comprising two or more activating materials (e.g., a first activating material and a second activating material, indium and gallium), the two or more activating materials may each independently be present in a particular ratio. In some embodiments, a molar ratio of indium and gallium is at least 1:1, at least 1.1:1, at least 1.2:1, at least 1.5:1, at least 1.7:1, at least 2:1, at least 2.5:1, at least 3:1, at least 5:1, or at least 10:1. In some embodiments, a molar ratio of indium and gallium is less than or equal to 10:1, less than or equal to 5:1, less than or equal to 3:1, less than or equal to 2.5:1, less than or equal to 2:1, less than or equal to 1.7:1, less than or equal to 1.5:1, less than or equal to 1.2:1, less than or equal to 1.1:1, or less than or equal to 1:1. Combinations of the foregoing ranges are also possible (e.g., at least 1:1 and less than or equal to 10:1). Of course, other ranges are possible as this disclosure is not so limited.

The activating metal (e.g., gallium and/or indium) may be present in a particular amount relative to the activated metal (or a metal to be activated), such as activated aluminum. For example, in some embodiments, the activating metal is greater than or equal to 0.1 wt %, greater than or equal to 1 wt %, greater than or equal to 2 wt %, greater than or equal to 3 wt %, greater than or equal to 4 wt %, greater than or equal to 5 wt %, greater than or equal to 7 wt %, greater than or equal to 10 wt %, greater than or equal to 12 wt %, or greater than or equal to 15 wt % relative to the activated metal. In some embodiments, the activating metal is less than or equal to 15 wt %, less than or equal to 12 wt %, less than or equal to 10 wt %, less than or equal to 7 wt %, less than or equal to 5 wt %, less than or equal to 4 wt %, less than or equal to 3 wt %, less than or equal to 2 wt %, less than or equal to 1 wt %, or less than or equal to 0.1 wt % relative to the activated metal. Combinations of the foregoing ranges are also possible (e.g., greater than or equal to 0.1 wt % and less than or equal to 15 wt %, relative the activated metal). Of course, other ranges are possible as this disclosure is not so limited.

Various embodiments described herein involve recovering the activating material from a solution, such as an aqueous solution. Accordingly, in some embodiments, an activating material may be recovered from a solution in which the solvent is water. Without wishing to be bound by any particular theory, water may react with an activated metal (e.g., aluminum), facilitating its dissolution and/or its conversion into products (e.g., hydrogen gas, aluminum-containing products, such as aluminum hydroxide and/or aluminum oxyhydroxide). As (or after) the activated metal reacts, the activating material (e.g., gallium and/or indium) may be recovered. In some embodiments, an activated aluminum is exposed to an aqueous solution. In some embodiments, a composition comprising an activated aluminum is added to an aqueous solution comprising aluminum hydroxide and the one or more activating materials. In some embodiments, an aqueous solution is in contact with the activated aluminum. In some such embodiments, the activating material may be recovered from the activated aluminum.

In some embodiments, the activating material may phase separate (i.e., form a segregated phase distinct from other phases). Advantageously, phase separation of the activating material from, for example, an aqueous solution, may improve recovery of the activating material. In some embodiments, the phase separated activating materials may combine or aggregate into a single mass that is phase separated from the solution, which may also advantageously facilitate recovery of the activating material. In some embodiments, the phase separated activating material has a density greater than that of the surrounding solution, such that at least a portion of the activating material sinks to a bottom of the solution relative to a local direction of gravity.

While various embodiments describe the recovery of activating materials from an aqueous solution, it should be understood that other solvents (e.g., alcohols, acids), additives, and/or contaminants may be present in the aqueous solution as the disclosure is not limited in this fashion.

This disclosure, in some embodiments, involves the direct manipulation of the solubility of aluminum (e.g., aluminum hydroxides) in order to keep their constituent ions dissolved and/or coordinated with other species dissolved in solution (e.g., to chelating agents dissolved in solution). In some embodiments, this involves the direct manipulation of the pH of the solution (through the use of solid, liquid or gas phase acids and/or buffer solutions) but may be extended to other techniques for manipulating this solubility equilibrium, i.e., electrochemical methods. Some other embodiments of this disclosure would involve the post-treatment of the solid aluminum hydroxide byproduct with acidification in order to recover the indium and gallium.

In some embodiments, the pH of the solution may be of a certain pH or changed to a certain pH. Those skilled in the art are familiar with techniques for changing or maintaining a certain pH (e.g., buffer solutions), some of which are described in more detail below. In some embodiments, the pH of the solution (e.g., the aqueous solution) is changed or maintained to a pH of less than or equal to 8.0, less than or equal to 7.5, less than or equal to 7.0, less than or equal to 6.5, less than or equal to 6.0, less than or equal to 5.5, less than or equal to 5.0, less than or equal to 4.5, less than or equal to 4.0, less than or equal to 3.5, less than or equal to 3.0, less than or equal to 2.5, or less than or equal to 2.0. Combinations of the foregoing range are also possible (e.g., greater than or equal to 2.0 and less than or equal to 8.0). Of course, other ranges are possible as this disclosure is not so limited.

There are multiple potential embodiments where the hydroxide ion (OH⁻) may be consumed in solution, thereby increasing the solubility of the aluminum hydroxide compound(s) in solution. In some embodiments, the pH of the solution can be decreased (e.g., by using any water-soluble acid) such that aqueous-phase protons neutralize the hydroxides. In some embodiments, the aluminum hydroxide is dissolved to form aluminum ions and hydroxide ions dissolved in the aqueous solution. In some embodiments, a method describes precipitating (or re-precipitating) aluminum hydroxide to precipitate a reformed aluminum hydroxide, wherein the reformed aluminum hydroxide does not comprise the one or more activating materials.

Other embodiments may involve sequestration reagents (e.g., water-soluble cage compounds with a high affinity to capture OH⁻), electrochemical manipulation of concentrations, or the use of sorption media (i.e., filters) that specifically absorb hydroxide from solution. This disclosure also incorporates other means by which OH⁻ concentration could be lowered.

The pH manipulation embodiment of this disclosure is described below. The pH of the water used for the reaction is lowered, and maintained as such, with either the use of an acid or a buffer solution. It is important that the acid or buffer be concentrated enough to prevent precipitation of aluminum hydroxides as shown in reaction 1 or 2. This is accomplished by having a reservoir of hydronium ($H_3O^+$) that is larger than the potential hydroxide (OH⁻) that could theoretically be produced by however much activated aluminum is fed into reactions 1 and 2.

$$2Al(s)+4H_2O(l) \leftrightarrow 3H_2(g)+2AlO(OH)(s) \quad (1)$$

$$2Al(s)+6H_2O(l) \leftrightarrow 3H_2(g)+2Al(OH)_3(s) \quad (2)$$

The acid may be in stoichiometric excess of the hydroxide to be formed in some embodiments. The presence of the hydronium (acid) reservoir allows manipulation of the solubility equilibrium of the aluminum hydroxide:

$$Al(OH)_3(s) \leftrightarrow Al^{3+}(aq)+3OH^-(aq)$$

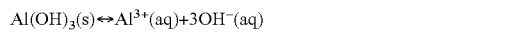
$$K_{sp}=3\times10^{-34}=[Al^{3+}][OH^-]^3/[Al(OH)_3] \quad (3)$$

Reaction 3 is the dissociation of aluminum trihydroxide in water. The solubility product $K_{sp}$ is a very small number, which suggests that reaction 3 will only produce a very small amount of soluble product. The products of this reaction are aluminum 3+ (a cation) and three equivalents of hydroxide. If the aqueous solution has a significant reservoir of hydronium present, the hydroxide is neutralized as per the following (competing) reaction:

$$OH^-(aq)+H_3O^+(aq) \leftrightarrow H_2O(l) \quad (4)$$

This neutralization reaction is a heavily favored "strong acid/strong base" reaction that proceeds almost completely to products, resulting in the formation of water. By driving the concentration of OH⁻ in solution down due the presence of excess hydronium ions (reaction 4), more and more aluminum hydroxide must dissolve in solution (reaction 3) in order to try and satisfy $K_{sp}$ above. From a mathematical standpoint, as the value of [OH⁻] approaches zero, the value of [$Al^{3+}$] gets larger in order to satisfy a situation where $K_{sp}$ is itself nonzero. This results in more and more aluminum being dissolved as [$Al^{3+}$] ions.

In some embodiments, the pH of a solution is changed or maintained using a buffer solution. Buffer solutions are known in the art and are solutions that comprise an acid and its conjugate base (or a base and its conjugate acid) that can be used to maintain the pH of a solution. In one embodiment, the buffer comprises citric acid/citrate. In another embodiment, the buffer comprises glutaric acid/glutarate. However, other buffers are possible. Non-limiting examples of buffers include acetic acid/acetate, and/or phosphoric acid and counterions thereof (e.g., $H_3PO_4$, $H_2PO_4^-$, $HPO_4^{2-}$, $PO_4^{3-}$). Other buffers are possible.

In some embodiments, a chelating agent may be present in order to maintain ions (e.g., aluminum ions) in solution. Chelating agents are chemical species that may coordinate to a metal ion at one or more positions. As an exemplary embodiment, the chelating is ethylenediaminetetraacetic (EDTA), which is capable of binding to a metal ion at up to six different positions (i.e., a hexadentate chelating agent). In another embodiment, the chelating agent comprises citrate. Additional examples of chelating agents include nitrilotriacetic acid (NTA), n-hydroxyethylethylenediaminetriacetic acid (HEDTA), oxalic acid, and/or malic acid, without limitation. Other chelating agents are possible. In some embodiments, the chelating agent is at least a bidentate chelating agent. In some embodiments, the chelating agent is at least a tridentate chelating agent. In some embodiments, the chelating agent is a hexadentate chelating agent.

When a solution (e.g., an aqueous solution) includes a chelating agent, the chelating agent may be present in a particular amount. Advantageously, the chelating agent may maintain aluminum ions in solution. In some embodiments, the concentration of the chelating agent in solution (e.g., aqueous solution) is greater than or equal to 0.1 g/L, greater than or equal to 0.5 g/L, greater than or equal to 1 g/L, greater than or equal to 2 g/L, greater than or equal to 5 g/L, greater than or equal to 10 g/L, greater than or equal to 15 g, or greater than or equal to 20 g/L. In some embodiments, the concentration of the chelating agent in solution is less than or equal to 20 g/L, less than or equal to 15 g/L, less than or equal to 10 g/L, less than or equal to 5 g/L, less than or equal to 2 g/L, less than or equal to 1 g/L, less than or equal to 0.5 g/L, less than or equal to 0.1 g/L. Combinations of the above-referenced ranges are also possible (e.g., greater than or equal to 0.1 g/L and less than or equal to 20 g/L). Other ranges are possible. In some embodiments, the concentration of the chelating agent is solution is selected relative to an amount of activated metal (e.g., activated aluminum), e.g., at least 1:1, at least 2:1, at least 3:1, at least 5:1, at least 10:1 relative to the molar amount of aluminum. In some embodiments, the molar ratio of chelating agent to activated aluminum is less than or equal to 1:1, less than or equal to 0.9:1, less than or equal to 0.8:1, less than or equal to 0.7:1, less than or equal to 0.5:1, less than or equal to 0.3:1, or less than or equal to 0.1:1. Other molar ratios are possible.

In some embodiments, a concentration of chelating agent in solution (e.g., aqueous solution) is greater than or equal to 0.01 M, greater than or equal to 0.1 M, greater than or equal to 0.5 M, greater than or equal to 1 M, greater than or equal to 2 M, greater than or equal to 3 M, greater than or equal to 5 M, greater than or equal to 7 M, greater than or equal to 10 M, or greater than or equal to 20 M. In some embodiments, the concentration of chelating agent in solution is less than or equal to 20 M, less than or equal to 10 M, less than or equal to 7 M, less than or equal to 5 M, less than or equal to 3 M, less than or equal to 2 M, less than or equal to 1 M, less than or equal to 0.5 M, less than or equal to 0.1 M, or less than or equal to 0.01 M. Combinations of the above-referenced ranges are also possible (e.g., greater than or equal to 0.01 M and less than or equal to 20 M). Other ranges are possible.

Reacting the activated metal (e.g., activated aluminum) may form one or more products. For example, in some embodiments, the aluminum in the activated aluminum is reacted with water of the aqueous solution to generate hydrogen (e.g., hydrogen gas) and/or aluminum ions. In some such embodiments, the aluminum ions may further react to form other aluminum-containing products, such as aluminum hydroxide and/or aluminum oxyhydroxide. Other products are possible.

The compositions and methods described herein are suitable for a variety of applications. For example, for compositions comprising an activated metal, the activating material may be recovered. In one embodiment, indium and/or gallium activated aluminum metal may be reacted with water, and the indium and/or gallium can be subsequently recovered. The recovered indium and/or gallium may be used to activate additional metals or more aluminum. When aluminum metal is activated, the source of aluminum can be any aluminum, aluminum alloy, or other appropriate metal that can be activated by an activating metal. In some embodiments, activated aluminum may be a fuel, and recovery of the activating materials may facilitate activating other aluminum to use as fuel.

The following examples are intended to illustrate certain embodiments of the present invention, but do not exemplify the full scope of the invention.

Example 1

The following example describes maintaining aluminum ions in solution during the reaction of activated aluminum.

A reaction of activated aluminum fuel (0.7119 g) was carried out at a temperature of 30° C. with a 400 mL volume of a 0.1 M citric acid buffer. Comparative versions of this experiment would have the reaction carried out with 400 mL of deionized water instead (uncontrolled pH). The citric acid buffer was created with a measured pH of 4. The buffer was prepared using 1.388 grams of citric acid and 9.638 grams of sodium citrate dehydrate (a base). The overall concentration of the buffer was designed to be 0.1 molar. After the creation of the buffer solution, its pH was further adjusted to a value of ~4.0 using 1.0 molar formic acid.

The reaction was initiated, by dropping a small pellet of aluminum fuel into the reaction vessel, which was actively stirred at 300 RPM. The reaction initiated and took a few minutes longer to release all of its heat than the typical reaction with deionized water. More heat was released in the reaction, likely from the exothermic contribution of the acid base neutralization (reaction 4 above). As the reaction progressed, it was noted that there was no formation of solid precipitates in the reaction. The reaction vessel got cloudy and turned a dull brown/grey color, which ultimately fades to a clear colorless solution post reaction. During the reaction, the pH (measured by a probe) rose from its starting value of 4 to an apex around 5 and then returned to 4 again. This was interpreted as the formation of hydroxide in solution that was then met with the hydronium reservoir of the buffer. Even though the reaction demonstrated a positive deviation of pH, the pH of the vessel only briefly rose above pH=5, and never drifted basic (i.e. above pH=7). When the reaction was complete, the solution in the vessel still had a dull brown color. The majority of this solution was filtered through a paper towel, and very minimal grey residue was observed on the towel. The last bit of solution contained in the reactor vessel contained a very small spherical bead of what appeared to be liquid metal.

The bead of liquid metal was transferred to a tared scintillation vial for drying and weighing. It was determined that the bead of liquid metal weighed 0.0233 g. According to the manufacturer of the activated aluminum fuel, the pellet of activated aluminum used in this reaction should have contained 0.02747 g of indium/gallium. 0.0233/0.0274 comes out to ~85% "recovery" of the activating metals in this experiment. While the purity and composition of the liquid metal extracted from solution was not directly assessed—however, it did exhibit characteristic liquid metal properties, i.e. beading up in water, splattering when dried out and agitated, splitting into smaller spheres when agitated, reformation of larger spheres on contact, etc.

Two follow-up reactions were carried out under substantially identical conditions with similar results. For these measurements, the recovered liquid metal was massed at 97.9% and 98.4% of what should have been initially present in the activated aluminum fuel. It is possible that the recovered liquid metal contains varying amounts of dissolved aluminum, which can still react with residual/ambient water. This could account for the range in mass % observed across the three experiments.

Example 2

The following example describes the effect of chelating agents on recovery of the liquid activating metals.

Recent experiments with different buffer chemistry (notably a glutaric acid/glutarate buffer at pH=4) allowed for pH control of the aluminum fuel/water reaction but did not result in formation of soluble aluminum species or the recovery of liquid activating metals (gallium and indium). These experiments suggested that control of pH alone may not be the sole determining factor for the recovery of activating metals. To date, the solution conditions that have resulted in the successful recovery of activating metals has been that of a (pH=4) citric acid/citrate buffer solution as well as oxalic acid/oxalate solution, which like citrate and unlike glutarate, is a strong chelator of $Al^{+3}$.

Figure 2:
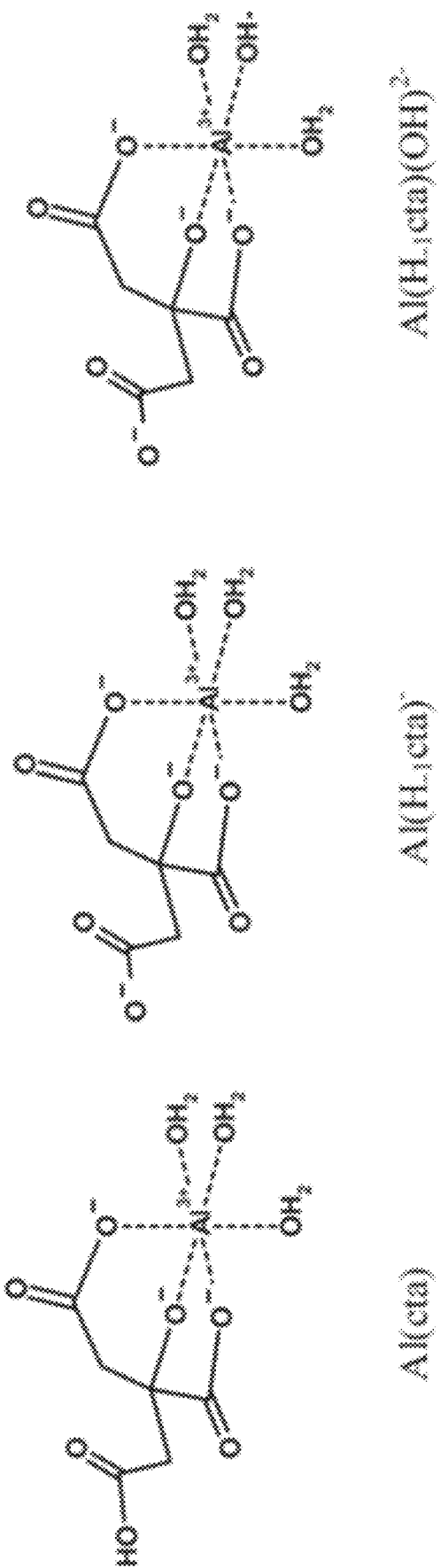
FIG. 2 is a schematic diagram of citrate chelating aluminum ions, according to some examples.

Without wishing to be bound by theory, it is theorized that chelation of aluminum ions by citrate ions is a contributor to the increased solubility of aluminum in the successful citric acid/citrate buffer experiments. Chelation is a special type of bonding, whereby the chelating agent or agents (in this case citrate) bonds to a central atom (in this case an aluminum ion) in one or more locations. When comparing formation of aluminum hydroxide ($Al(OH)_3$) to the formation of aluminum citrate, it is clear that formation of aluminum citrate should be thermodynamically favored from an entropic perspective. For one, solids tend to have low entropy as compared to soluble species. So the formation of a soluble citrate species should be entropically (thermodynamically) favored. Additionally, forming aluminum citrate instead of aluminum hydroxide "frees up" three hydroxides that would otherwise be bound to the aluminum, further increasing the entropy of the resulting solution. Citrate is a tridentate ligand, forming three coordinate bonds to the central aluminum ion, as illustrated schematically in FIG. 2. (Neutral, singly negatively charged, and doubly negatively charged citrate aluminum complexes, taken from: 'Modeling and Separation-Detection Methods to Evaluate the Speciation of Metals for Toxicity Assessment, by Caruso et. al., January 2006, Journal of Toxicology and Environmental Health Part B, 9(1): 41-61).

Electrospray mass spectrometer analysis of the clear, supernatant solution resulting from isolation of activating metals via a citric acid/citrate buffer was carried out. This testing confirmed the presence of aluminum citrate in solution.

It should also be noted that the use of buffer solutions to control pH (and relative concentrations of acid/base reservoir species) remains an important factor in manipulating equilibrium conditions to balance solubility and the formation of liquid metals. For example, a reaction of activated aluminum metal with a simple pH=2.5 citric acid solution did not enable recovery of the activating metals, despite the presence of citrate ions in solution.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A withoutB(optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage. As used herein, "at %" is an abbreviation of atomic percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of recovering one or more activating materials, the method comprising:
   adding a composition comprising aluminum hydroxide and the one or more activating materials to an aqueous solution, wherein the one or more activating materials includes at least one selected from the group of indium and gallium;

dissolving the aluminum hydroxide to form aluminum ions and hydroxide ions dissolved in the aqueous solution; and forming a separate phase comprising the activating materials.

2. The method of claim 1, further comprising controlling a composition of the aqueous solution to maintain the aluminum ions dissolved in the aqueous solution.

3. The method of claim 1, further comprising combining at least two separate phases comprising the activating materials into a mass.

4. The method of claim 1, further comprising maintaining a pH of the aqueous solution to be greater than or equal to 2.5 and less than or equal to 8.

5. The method of claim 1, further comprising maintaining a pH of the aqueous solution to be less than 7.

6. The method of claim 1, wherein the aqueous solution includes a chelating agent.

7. The method claim 6, wherein the chelating agent is at least one selected from the group of citrate and oxalate.

8. The method of claim 6, wherein the chelating agent is at least bidentate.

9. The method of claim 6, wherein the chelating agent is at least tridentate.

10. The method of claim 1, further comprising precipitating aluminum hydroxide.

11. The method of claim 10, wherein precipitating aluminum hydroxide precipitates a reformed aluminum hydroxide, wherein the reformed aluminum hydroxide does not comprise the one or more activating materials.

12. The method of claim 1, further comprising combining at least two separate phases comprising activating materials into a mass comprising gallium and/or indium.

13. The method of claim 12, wherein a mass ratio of indium and gallium is greater than or equal to 1.

14. The method of claim 12, wherein a wt % of the gallium and/or indium relative to the aluminum is greater than or equal to 0.1 wt %.

15. The method of claim 1, wherein the aqueous solution is an acidic aqueous solution.

* * * * *